United States Patent
Sakai

(10) Patent No.: US 10,749,425 B2
(45) Date of Patent: Aug. 18, 2020

(54) POWER SUPPLY APPARATUS AND IMAGE FORMING APPARATUS

(71) Applicant: CANON KABUSHIKI KAISHA, Tokyo (JP)

(72) Inventor: Masayuki Sakai, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/245,162

(22) Filed: Jan. 10, 2019

(65) Prior Publication Data

US 2019/0222112 A1   Jul. 18, 2019

(30) Foreign Application Priority Data

Jan. 17, 2018  (JP) .................................. 2018-005349
Nov. 20, 2018  (JP) .................................. 2018-217207

(51) Int. Cl.
| | |
|---|---|
| *H02M 1/32* | (2007.01) |
| *H02M 3/335* | (2006.01) |
| *G03G 15/00* | (2006.01) |
| *G01K 7/22* | (2006.01) |
| *H01C 7/00* | (2006.01) |
| *H02M 1/00* | (2006.01) |

(52) U.S. Cl.
CPC .............. *H02M 1/32* (2013.01); *G01K 7/22* (2013.01); *G03G 15/80* (2013.01); *H01C 7/008* (2013.01); *H02M 3/33523* (2013.01); *H02M 2001/0032* (2013.01); *H02M 2001/327* (2013.01)

(58) Field of Classification Search
CPC .............. H02M 1/32; H02M 3/33523; H02M 2001/0032; H02M 2001/327; H01C 7/008; G01K 7/22; G03G 15/80
See application file for complete search history.

(56) References Cited

U.S. PATENT DOCUMENTS

| | | |
|---|---|---|
| 5,867,638 A | 2/1999 | Sakai |
| 9,599,944 B2 | 3/2017 | Sakai |
| 2014/0086600 A1* | 3/2014 | Cui ........................ G03G 21/20 399/33 |
| 2015/0049521 A1* | 2/2015 | Iorio ................... H02M 3/1588 363/21.02 |
| 2015/0278665 A1* | 10/2015 | Imamura ............ G06K 15/4055 358/1.14 |
| 2017/0150614 A1 | 5/2017 | Sakai |
| 2017/0261910 A1* | 9/2017 | Kasamatsu ............ G03G 15/80 |
| 2017/0365994 A1* | 12/2017 | Kikuchi ............. H05B 37/0227 |

FOREIGN PATENT DOCUMENTS

| | | |
|---|---|---|
| JP | 2002-209378 | 7/2002 |
| JP | 2010-206982 | 9/2010 |

* cited by examiner

*Primary Examiner* — Emily P Pham
(74) *Attorney, Agent, or Firm* — Venable LLP

(57) ABSTRACT

The power supply apparatus includes a circuit board on which mounted are a transformer, a switching element connected in series with a primary winding of the transformer, a rectification element connected with a secondary winding of the transformer, a detection unit detecting a temperature of the rectification element when the transformer is supplied with power by a switching operation of the switching element, and a resistance element connected in parallel with the rectification element. The resistance element is mounted at a predetermined mounting section among a plurality of mounting sections on the circuit board.

16 Claims, 7 Drawing Sheets

SOLDER SURFACE

PRODUCT MODEL A
PARTS SURFACE

PRODUCT MODEL B
PARTS SURFACE

SOLDER SURFACE

PRODUCT MODEL C
PARTS SURFACE

PRODUCT MODEL D
PARTS SURFACE

POWER SUPPLY APPARATUS AND IMAGE FORMING APPARATUS

BACKGROUND OF THE INVENTION

Field of the Invention

The present invention relates to a power supply apparatus using an isolation transformer, and an image forming apparatus.

Description of the Related Art

Recently, standby power consumption reduction has been demanded. A switching power supply apparatus provided in an image forming apparatus such as a laser beam printer may use multiple voltages in operation in some case. For example, a higher voltage (e.g., DC 24 V) is used in a drive system such as a motor, and a lower voltage (e.g. DC 3.3 V) is used in a control system such as a microcomputer. The former tolerates even a rather rough voltage, but the latter voltage requires a predetermined voltage accuracy. In order to output multiple voltages like this, there is widely used, in the switching power supply apparatus, a system in which the higher voltage used by the drive system is applied to a load side, and a DC/DC converter on the load side converts a voltage for the drive system into a high accuracy voltage used by the control system. In general, in the image forming apparatus, only the control system operates in a standby state, and therefore, an efficiency of the DC/DC converter in the switching power supply apparatus is necessary to be highly promoted for reducing the power consumption in the standby state. The smaller a difference between an input voltage and an output voltage, the higher the efficiency of DC/DC converter. For this reason, Japanese Patent Application Laid-Open No. 2010-206982 has proposed a switching power supply apparatus in which the input voltage of the DC/DC converter, that is, the output voltage of the a switching power supply apparatus is decreased while the image forming apparatus on the load side is in a standby state of lower power consumption, so that the power consumption is reduced.

In a case that the DC/DC converter is failed in a state of outputting a lower voltage like in a standby state, a high current flows in the switching power supply apparatus remained in the state of outputting the lower voltage, and therefore, an overheat protection unit is needed. Therefore, Japanese Patent Application Laid-Open No. 2002-209378 has proposed a method in which a temperature detection element is located near heat generation source parts such as a transformer mounted on the switching power supply apparatus, and then, when a predetermined temperature is reached, power supply to a load is stopped. In the switching power supply apparatus, if the high current flows in the state of outputting the lower voltage like in the standby state, heat generation becomes noticeable in a schottky barrier diode (hereinafter, abbreviated as a SBD) for rectification provided in a secondary side of the transformer. For this reason, there is a switching power supply apparatus having a configuration in which the temperature detection element is located also near the SBD as well as near the transformer to give the overheat protection for the SBD.

However, multiple product models of the image forming apparatus such as a laser beam printer may be prepared by using the switching power supply apparatuses including the same circuit board to add a scanner function or add a paper cassette to a print engine. Adding functions or apparatuses to even the same print engine may increase an amount of electrical power supplied by the switching power supply apparatus. On the other hand, in a product model with a lower power consumption for the purpose of cost reduction, a heat sink attached to the SBD for rectification of the switching power supply apparatus is removed, or the SBD for rectification is replaced by a low cost one. Therefore, since thermal coupling of the SBD and the temperature detection element is different according to the product model, a detection temperature at which a overheat protection circuit detects an overheating state disperses according to the product model. As a result, increasing of an overheating detection temperature in the overheat protection circuit may lead to increase in detection temperature dispersion of a thermistor. On the other hand, decreasing too much of the overheating detection temperature may lead to false detection of the overheating state according to atmosphere temperature dispersion in ordinary printing.

SUMMARY OF THE INVENTION

As aspect of the present invention is a power supply apparatus capable of detecting an overheating state in a circuit configuration using the same circuit board in different product models.

Another aspect of the present invention is a power supply apparatus including a circuit board including a transformer having a primary winding and a secondary winding, a switching element connected in series with the primary winding of the transformer, a rectification element connected with the secondary winding of the transformer, a detection unit configured to detect temperature of the rectification element in a case where power is supplied to the transformer by a switching operation of the switching element, and a resistance element connected in parallel with the rectification element, wherein the resistance element is mounted at a predetermined mounting section among mounting sections on the circuit board.

An further aspect of the present invention is an image forming apparatus including an image forming unit forming an image on a recording material, and a power supply apparatus generating power for forming an image, the power supply apparatus including a circuit board including a transformer having a primary winding and a secondary winding, a switching element connected in series with the primary winding of the transformer, a rectification element connected with the secondary winding of the transformer, a detection unit configured to detect temperature of the rectification element in a case where power is supplied to the transformer by a switching operation of the switching element, and a resistance element connected in parallel with the rectification element, wherein the resistance element is mounted at a predetermined mounting section among mounting sections on the circuit board.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Configuration of Switching Power Supply]

Figure 1:
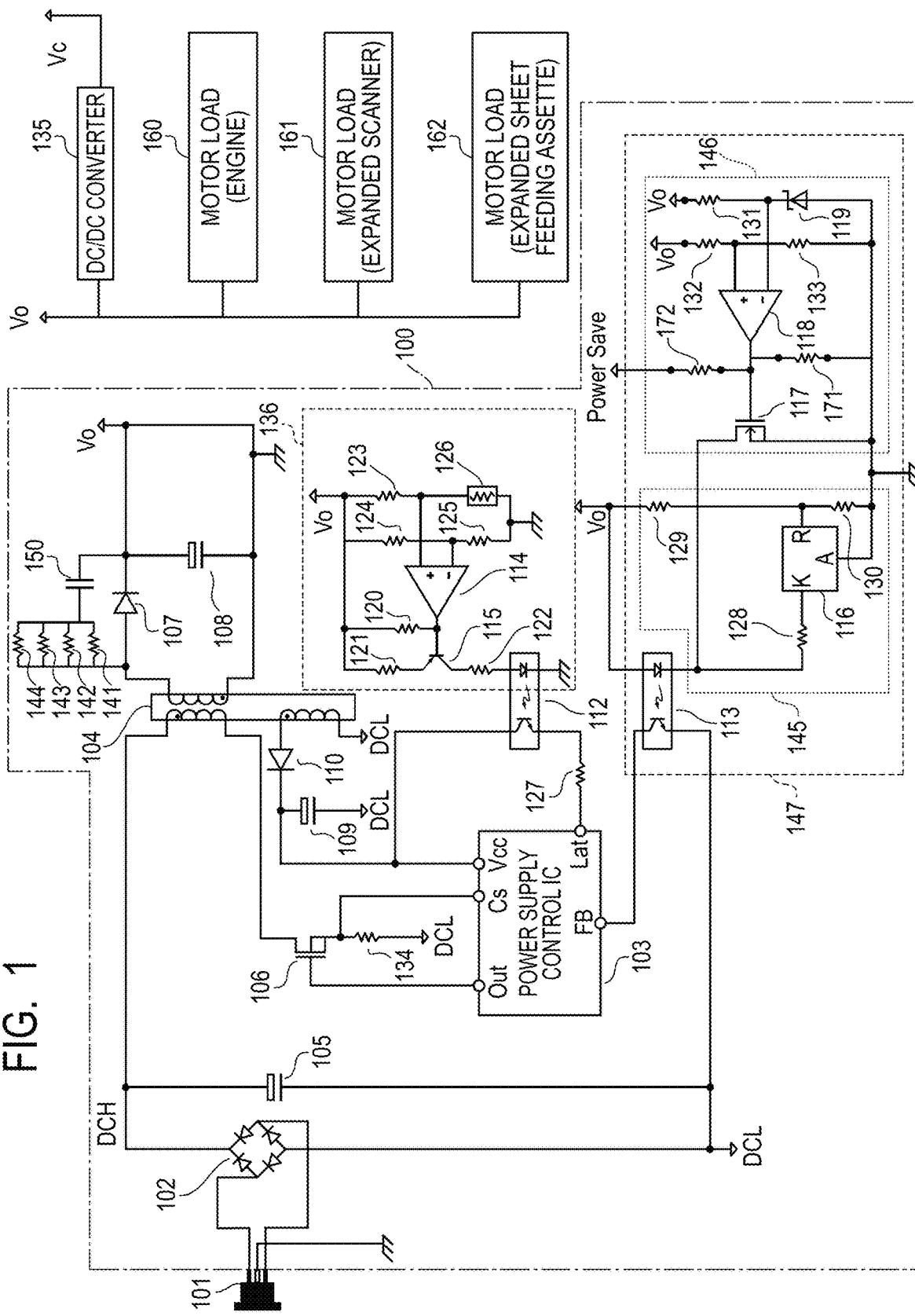
FIG. 1 is a circuit diagram illustrating a configuration of a switching power supply apparatus in embodiments 1 and 2.

FIG. 1 is a circuit diagram illustrating a configuration of a switching power supply apparatus 100 in embodiment 1. The switching power supply apparatus 100 (in the figure, a portion framed by a dash-single-dot line) is a capacitor input type switching power supply apparatus in which an AC voltage input from an inlet 101 is rectified by a bridge diode 102 and smoothed into a DC voltage by electrolytic capacitor 105. The electrolytic capacitor 105 is a smoothing unit smoothing the DC voltage rectified by the bridge diode 102, assuming that a low potential side of the electrolytic capacitor 105 is DCL (the same potential as a ground) and a high potential side is DCH. The switching power supply apparatus 100 in the embodiment outputs an output voltage Vo from an input voltage charged by electrolytic capacitor 105 to an insulated secondary side of a transformer 104.

The switching power supply apparatus 100 includes the transformer 104 having a primary winding and an auxiliary winding on a primary side thereof and a secondary winding on the secondary side thereof. The primary winding of the transformer 104 to the secondary winding is supplied with an energy by a switching operation of a field-effect transistor (hereinafter, referred to as FET) 106 that is a switching element described later. The auxiliary winding of the transformer 104 rectifies and smooths a forward voltage of the input voltage applied to the primary winding by a diode 110 and an electrolytic capacitor 109, and supplies a power supply voltage to a Vcc terminal of a power supply control IC 103 that is a control unit controlling the switching power supply apparatus 100. The power supplied to the transformer 104 is controlled by a switching operation of the FET 106 connected in series with the primary winding of the transformer 104. The FET 106 is on/off-controlled by a control signal output from an Out terminal of the power supply control IC 103. The switching power supply apparatus 100 in the embodiment is a flyback type, and the power supplied to the transformer 104 is supplied to the secondary side when the FET 106 is in a turn-off state, and then, a voltage is induced in the secondary winding. The power supplied to the secondary side by the transformer 104 is rectified and smoothed by a SBD (schottky barrier diode) 107 for rectification that is a rectification unit, and an electrolytic capacitor 108 that is a smoothing unit, and then, a DC output voltage Vo is generated.

Figure 6:
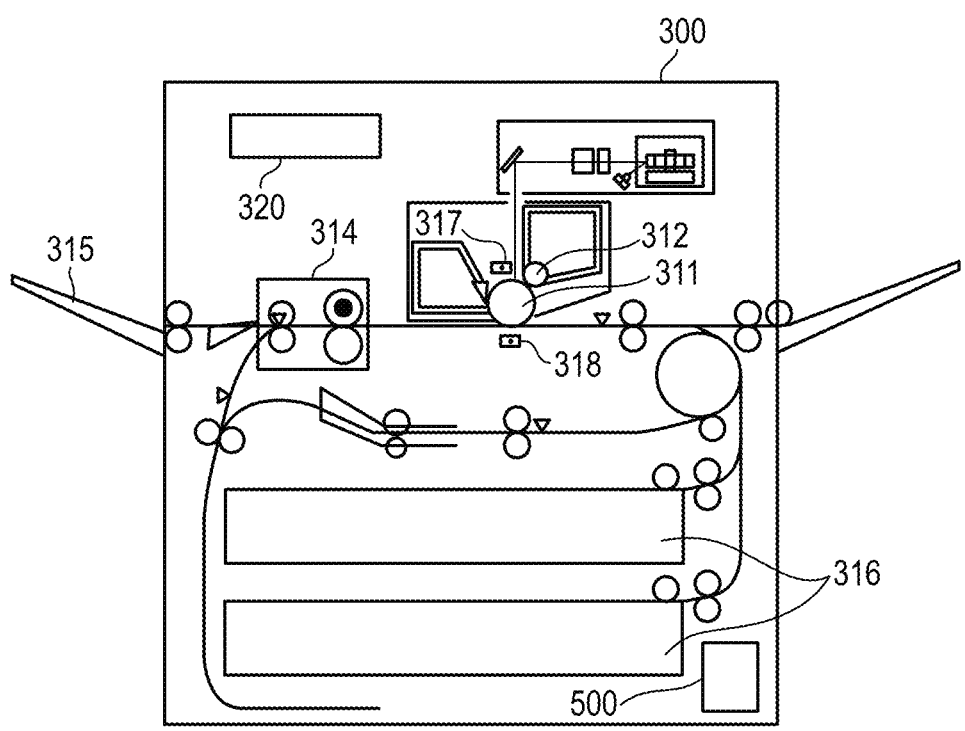
FIG. 6 is a sectional view illustrating a configuration of an image forming apparatus in an embodiment 3.
Figure 7A:
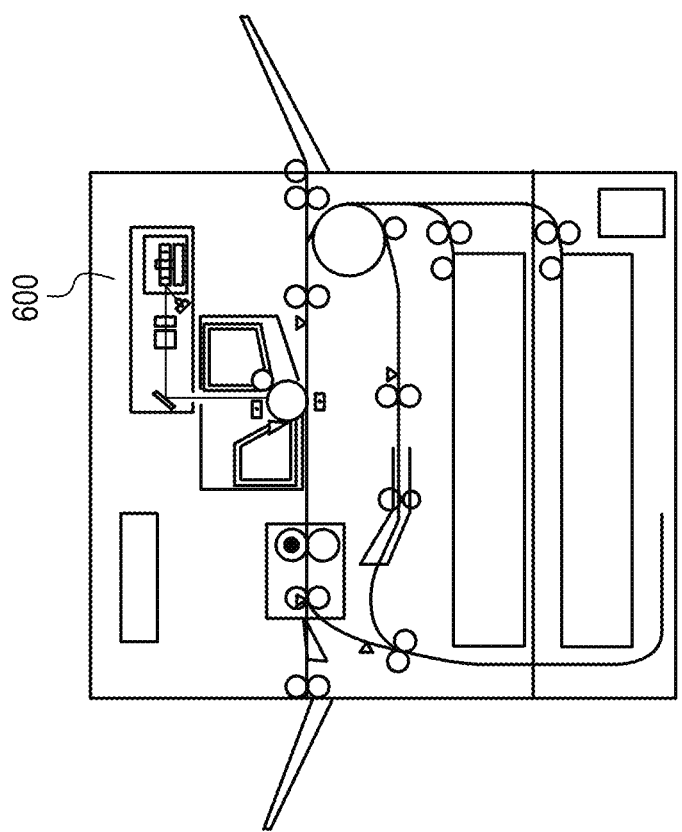
FIG. 7A and FIG. 7B are each a diagram illustrating a configuration of a product model.
Figure 7B:
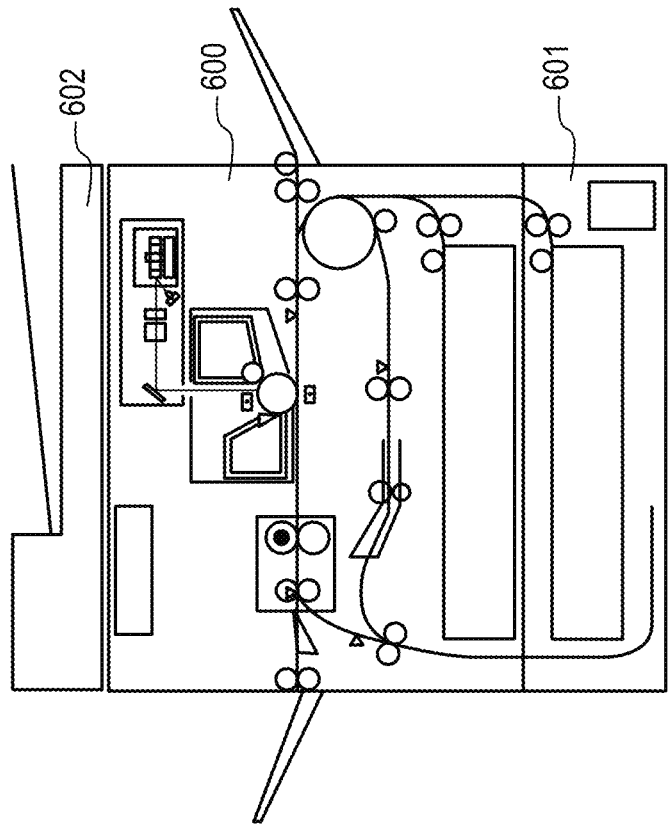

The SBD 107 is connected in parallel with a circuit in which multiple resistors 141, 142, 143 and 144 connected in parallel with each other are connected in series with a capacitor 150. Resistors 141 to 144 are each a resistor for a snubber circuit of the SBD 107, and any one of the resistors 141 to 144 is selected according to the product model as described later. A description is given of a configuration of the product model based on FIG. 7A and FIG. 7B. FIG. 7A illustrates a model having an image forming apparatus 600, a reading apparatus 602 reading a document, and an optional paper cassette 601 optionally added. FIG. 7B illustrates a model having only the image forming apparatus 600. The product model of FIG. 7A is higher in a load in operation than that of FIG. 7B. The internal components of the image forming apparatus 600 depicted in FIGS. 7A and 7B are described in more detail below with regard to FIG. 6.

FIG. 1 illustrates the resistors more than those used practically, and assume that one resistor of the multiple resistors is connected. The output voltage Vo of the switching power supply apparatus 100 is supplied to electronic equipment connected with the switching power supply apparatus 100. In FIG. 1, the image forming apparatus described above is illustrated as an example of the electronic equipment. The output voltage Vo of the switching power supply apparatus 100 is supplied to a drive system with a higher power consumption such as a motor load (engine) 160, a motor load (expanded scanner) 161, and a motor load (expanded sheet feeding cassette) 162, and a DC/DC converter 135 in the image forming apparatus. The motor load (engine) 160 refers to a motor load driven in an image forming unit (engine) that is a print engine of the image forming apparatus. The motor load (expanded scanner) 161 refers to a load on a motor used in a scanner apparatus in the product model of the image forming apparatus to which the scanner apparatus is added. Similarly, the motor load (expanded sheet feeding cassette) 162 refers to a load on a motor used in the added optional paper cassette in the product model of the image forming apparatus to which the paper cassette is added. Furthermore, the DC/DC converter 135 generates a DC voltage Vc (3.3 V) owing to the output voltage Vo and supplies the generated voltage to the control system such as a CPU.

(Control on Output Voltage)

Next, a description is given of control by the power supply control IC 103 on the output voltage Vo. A high level or low level of a control signal output from the Out terminal of the power supply control IC 103 to a gate terminal of the FET 106 is determined according to an input voltage of a Cs terminal and an input voltage of a FB terminal. Input to the Cs terminal is a voltage generated on both ends of a current detection resistor 134 owing to a current flowing through a drain terminal when the FET 106 is in a turn-on state. Therefore, the input voltage of the Cs terminal can be also rephrased as an input power supplied to the transformer 104. The switching power supply apparatus 100 includes a feedback unit 147 (described later in detail) transmitting a deviation between a target voltage value of the output voltage Vo of the transformer 104 and an actual output voltage value through a photocoupler 113 to the primary side. The feedback unit 147 changes the input voltage of the FB terminal of the power supply control IC 103 according to variation of the output voltage Vo. The power supply control IC 103 outputs a low-level signal when the input voltage of the Cs terminal becomes equal to the input voltage of the FB terminal and outputs a high-level signal otherwise to control a turn-on/off state of the FET 106 based on the voltage input to the FB terminal. This allows the input power to the transformer 104 to be controlled, and as a result, a voltage value of the output voltage Vo is controlled.

The switching power supply apparatus 100 in the embodiment can switch the output voltage Vo to be supplied to the load, and the output voltage can be switched between DC 24 V and DC 6 V. The DC 24 V is a higher voltage for supplying the power to a motor drive system on the load side such as the motor load (engine) 160, the motor load (expanded scanner) 161, and the motor load (expanded sheet feeding cassette) 162. On the other hand, the DC 6 V is a lower voltage for highly efficiently operating the DC/DC converter 135.

(Feedback Unit)

The feedback unit 147, that is a feedback device, detects the voltage value of the output voltage Vo, and notifies the power supply control IC 103 of information on the deviation between the detected voltage value and the target voltage value of the output voltage Vo. The feedback unit 147 includes a first circuit unit 145 monitoring an output voltage of DC 24 V, and a second circuit unit 146 monitoring an output voltage of DC 6 V. The first circuit unit 145 includes voltage dividing resistors 129 and 130 dividing the output voltage Vo, a current-limiting resistor 128 controlling a current flowing through a LED of the photocoupler 113, and a shunt regulator 116. On the other hand, the second circuit unit 146 includes an FET 117, a comparator 118, a zener diode 119 supplying a reference voltage to the comparator 118, resistors 132 and 133 dividing the output voltage Vo, and current-limiting resistors 131, 171 and 172. The FET 117 drives a secondary side LED of the photocoupler 113. The comparator 118 compares magnitudes of the voltages input to two input terminals (plus terminal, minus terminal) to output a comparison result.

Switching of the output voltage Vo between the DC 24 V (hereinafter, simply referred to as 24 V also) and the DC 6 V (hereinafter, simply referred to as 6 V also) is performed by a PowerSave signal input from an external control system (e.g., a CPU). The switching power supply apparatus 100 in the embodiment is configured such that the output voltage VO of one of DC 24 V and DC 6 V is output when the PowerSave signal is the low level or the high level, respectively. In the case that the PowerSave signal is the low level, an output of the comparator 118 having an output terminal that is an open collector is fixed to the low level. Since the output terminal of the comparator 118 is connected to a gate terminal of the FET 117 and the output of the comparator 118 is the low level, the FET 117 is in the turn-off state. Therefore, feedback control on the FB terminal of the power supply control IC 103 in the case that output voltage Vo is 24 V is performed by the first circuit unit 145.

In the first circuit unit 145, input to a reference terminal of the shunt regulator 116 (designated by R in the figure) is a voltage obtained by dividing the output voltage Vo by the voltage dividing resistors 129 and 130. The shunt regulator 116 is put into a conductive state when the voltage input to the reference terminal is higher than the reference voltage that is the target voltage of the output voltage Vo. As a result, a current flows from cathode terminal K of the shunt regulator 116, and the secondary side LED of the photocoupler 113 is put into a conductive state via the current-limiting resistor 128. This allows a primary side phototransistor of the photocoupler 113 is put into a turn-on state, and the input voltage of the FB terminal of the power supply control IC 103 is decreased. On the other hand, if the voltage of the output voltage Vo is lower than the target voltage, a current does not flow from the cathode terminal K of the shunt regulator 116, and as a result, the secondary side LED of the photocoupler 113 is put into a non-conductive state. This allows the primary side phototransistor of the photocoupler 113 to be put into a turn-off state, and the input voltage of the FB terminal of the power supply control IC 103 is increased. In this way, the first circuit unit 145 changes the input voltage of the FB terminal of the power supply control IC 103 according to the variation of the output voltage Vo of DC 24 V.

On the other hand, in the case that the PowerSave signal is the high level, an output from the output terminal of the comparator 118 having the open collector is effective. Since the output terminal of the comparator 118 is connected with the gate terminal of the FET 117, the output from the comparator 118 controls the turn-on/off state of the FET 117. Therefore, in the case that the PowerSave signal is the high level, that is, in the case that the output voltage Vo is the DC 6 V, the feedback control on the power supply control IC 103 in that output voltage Vo state is performed by the second circuit unit 146.

In the second circuit unit 146, input to a non-inverting input terminal (+) of the comparator 118 is a voltage obtained by dividing the output voltage Vo by the voltage dividing resistors 132 and 133. Moreover, input to an inverting input terminal (-) is the target voltage by the zener diode 119. For the zener diode 119, a zener voltage is selected such that the output voltage Vo of the switching power supply apparatus 100 is the DC 6 V. Therefore, the voltage input via the photocoupler 113 to the FB terminal of the power supply control IC 103 is set such that the output voltage Vo is 6 V. In the case that the output voltage Vo is 6 V, shunt regulator 116 in the first circuit unit 145 is put into a non-conductive state. In this way, by switching of the PowerSave signal between the high level and the low level, the switching power supply apparatus 100 can switch two kinds of output voltages Vo.

(Overheat Protection Circuit)

Figure 2:
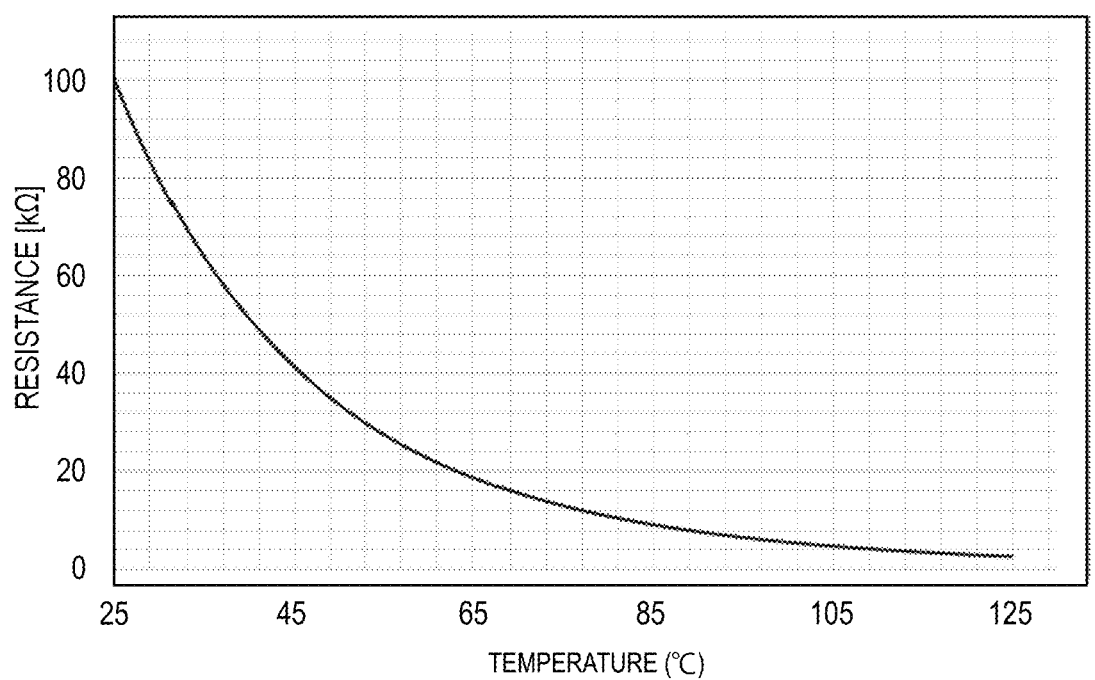
FIG. 2 is a graph illustrating a temperature characteristic of a thermistor in the embodiments 1 and 2.

Subsequently, a description is given of an overheat protection circuit 136 that is a detection unit detecting an overheating state of the transformer 104. In the overheat protection circuit 136 in the embodiment, an NTC chip thermistor (hereinafter, referred to as a thermistor) 126 is used as a temperature detection element which has a negative temperature coefficient where a resistor value decreases relative to temperature increase. FIG. 2 is a graph illustrating a temperature characteristic of the thermistor 126, and an ordinate represents a resistor value [unit: kΩ] and an abscissa represents an temperature [unit: ° C.]. As illustrated in FIG. 2, it can be seen that the resistor value of the thermistor 126 decreases in an exponential fashion as the temperature increases.

As illustrated in FIG. 1, the overheat protection circuit 136 includes a comparator 114, a PNP-type transistor 115, a photocoupler 112, a thermistor 126, and resistors 120, 121, 122, 123, 124 and 125. Input to a non-inverting input terminal (+) of the comparator 114 is a voltage obtained by dividing the output voltage Vo by the resistor 123 and a resistor of the thermistor 126 each of which is a voltage dividing unit. Input to an inverting input terminal (-) of the comparator 114 is a voltage obtained by dividing the output voltage Vo by the resistors 124 and 125.

The overheat protection circuit 136 in the embodiment inputs the voltage obtained by dividing the output voltage Vo by the resistors 124 and 125 to one input terminal (minus terminal) of the comparator 114 that is a comparator. On the other hand, input to the other input terminal (plus terminal) of the comparator 114 is a voltage obtained by dividing the same output voltage Vo by the voltage dividing resistor including the thermistor 126. As described above, the resistor value of the thermistor 126 decreases as the temperature increases. Therefore, if the temperature increases, the voltage input to the plus terminal of the comparator 114 decreases to be lower than the voltage input to the minus terminal. As a result, if the temperature detected by the thermistor 126 is in the overheating state of being higher than a predetermined temperature, a signal of the low level is output from the output terminal of the comparator 114.

The output terminal of the comparator 114 is pulled up via the resistor 120 by the output voltage Vo and connected with a base terminal of the transistor 115. An emitter terminal of the transistor 115 is connected via the resistor 121 with the output voltage Vo, and a collector terminal thereof is connected via the resistor 122 with an anode terminal of the secondary side LED of the photocoupler 112. In a case that the high-level signal is output from the output terminal of the comparator 114, that is, in a case that the temperature of the thermistor 126 is lower than a predetermined temperature, the transistor 115 is in a turn-off state. On the other hand, in a case that the low-level signal (overheating detection signal) is output from the output terminal of the comparator 114, that is, the temperature of the thermistor 126 is higher than a predetermined temperature, the transistor 115 is in a turn-on state. If the transistor 115 is in the turn-on state, the secondary side LED of the photocoupler 112 is put into the conductive state and the primary side phototransistor is put into turn-on state, and then, a signal of the high level is input via the resistor 127 to a Lat terminal of the power supply control IC 103. When the high-level signal is input to the Lat terminal the power supply control IC 103 sets an output signal from the Out terminal to the low level to force the FET 106 to stop the switching operation and block the supply of the power to the load.

Figure 3:
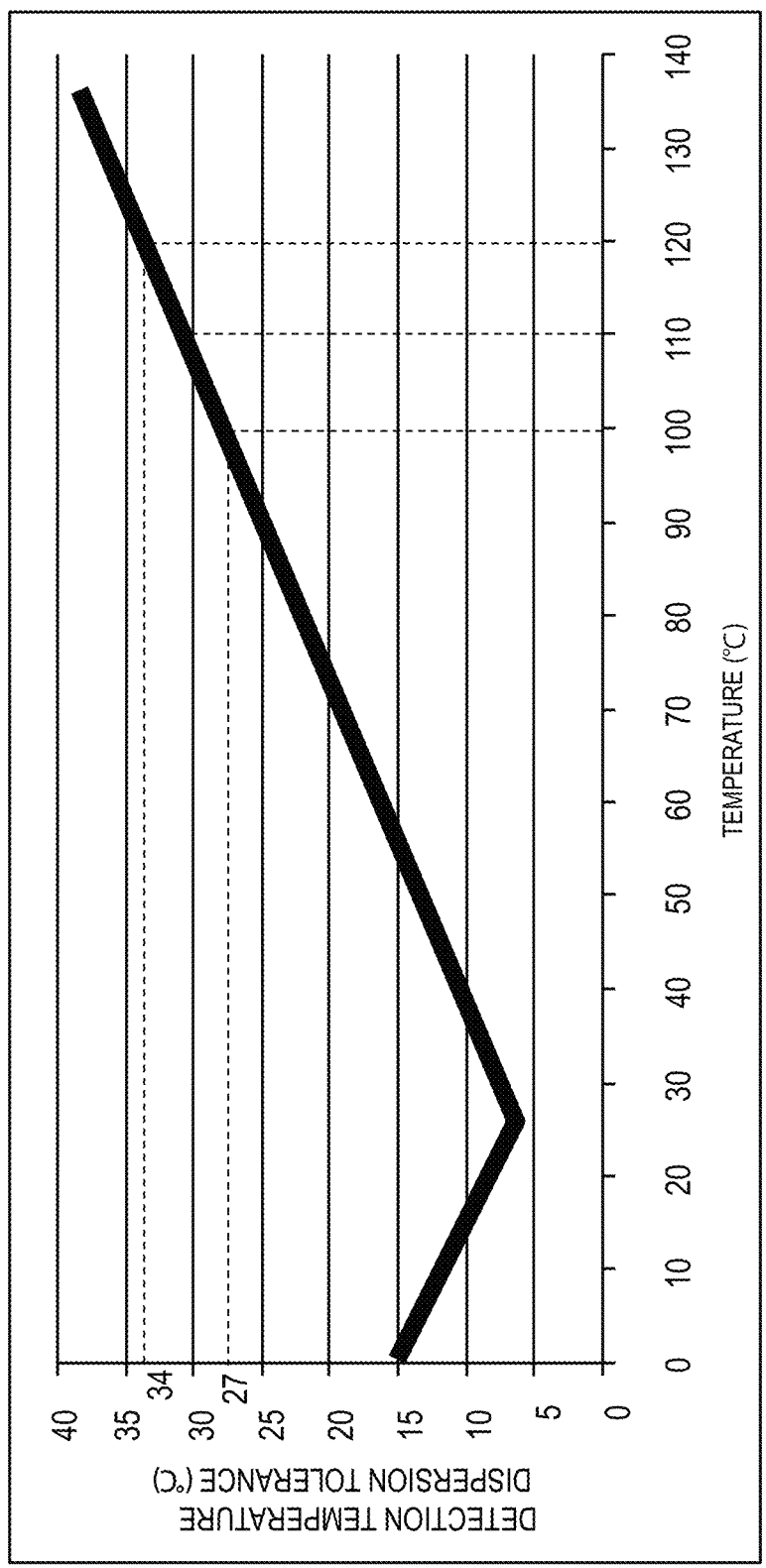
FIG. 3 is a graph illustrating dispersion of a detection temperature of the thermistor in the embodiments 1 and 2.

Assume that the thermistor 126 used in the embodiment is an inexpensive surface-mount type chip thermistor used for room temperature detection. FIG. 3 is a graph illustrating dispersion of a detection temperature of the thermistor 126 in the embodiment. In FIG. 3, an abscissa represents a detection temperature of the thermistor 126 (unit: ° C.), and an ordinate represents a dispersion tolerance of the detection temperature (unit: ° C.). Although in FIG. 3 illustrates only a positive dispersion tolerance as the dispersion tolerance, a practical tolerance has the same dispersion tolerance on the negative side also. For example, in FIG. 3, a dispersion tolerance in a case of a detection temperature of 100° C. presents about 27° C., but a practical dispersion tolerance is about ±27° C. Specifically, the temperature detected by the thermistor 126 has a width (range) of 73° C. (=100° C.-27° C.) to 127° C. (=100° C.+27° C.). Similarly, dispersion tolerances in cases of a detection temperature of 110° C. and 120° C., present about ±30° C. and about ±34° C., respectively. As illustrated in FIG. 3, the dispersion tolerance of the detection temperature by the thermistor 126 is the smallest when the detection temperature is 25° C., and the detection temperature dispersion width (range) increases as the detection temperature increases. Therefore, the overheat protection circuit 136 operated at the lower detection temperature allows the dispersion of the detection temperature of the thermistor 126 to be more decreased.

[Circuit Board of Switching Power Supply Apparatus]
(Configuration of Circuit Board)

Figure 4A:
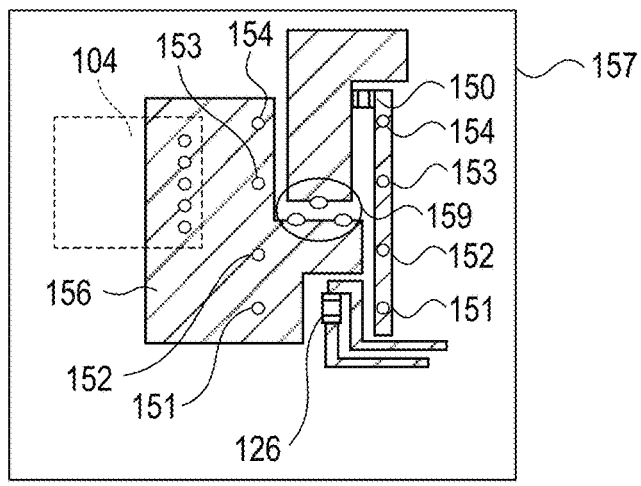
FIG. 4A illustrates a circuit pattern of a board in the embodiment 1.

Subsequently, a description is given of a configuration of a circuit board of the switching power supply apparatus 100 in the embodiment. The circuit board in the embodiment is common to the respective product models as described above. FIG. 4A is a diagram illustrating a solder surface side of a circuit board 157. FIG. 4A is the diagram cutting out and illustrating a part of the circuit board 157 on which mounted are the transformer 104, the SBD 107 for rectification, the thermistor 126, the resistors 141 to 144, and the capacitor 150 among the circuit configuration illustrated in FIG. 1. In FIG. 4A, a hatched part is a wiring pattern (circuit pattern), and the chip thermistor 126 and the capacitor 150 are surface-mounted on the solder surface side. The thermistor 126 is arranged near a located position 159 of the SBD 107 in such a manner as not to prohibit the wiring pattern 156 from running from the transformer 104 to the SBD 107. The circuit board 157 is provided with holes (also referred to as through-holes) 151, 152, 153 and 154 which are mounting sections for mounting lead-type resistors 141, 142, 143 and 144 for the snubber circuit of the SBD 107. This allows the resistors for the snubber circuit to be mounted to be gradually apart from near the thermistor 126 in an order of the resistors 141, 142, 143 and 144. In the circuit board 157 illustrated in FIG. 4A, positions where the transformer 104 and the thermistor 126 are mounted are determined. Each of the resistors 141 to 144 is a heat generating element similar to the SBD 107, and has an effect on the temperature detection by the thermistor 126. Therefore, any resistor of the resistors 141 to 144 is used according to the product model using the switching power supply apparatus 100.

(Parts Mounting on Product Model A)

Figure 4B:
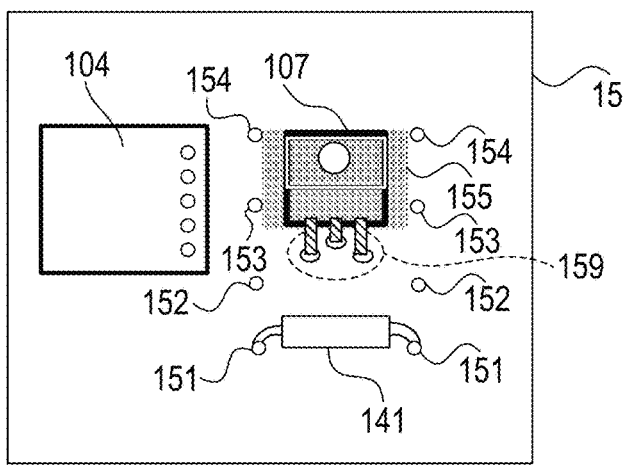
FIG. 4B and FIG. 4C are each a diagram illustrating a parts mounting state on a board for each product in the embodiment 1.
Figure 4B:
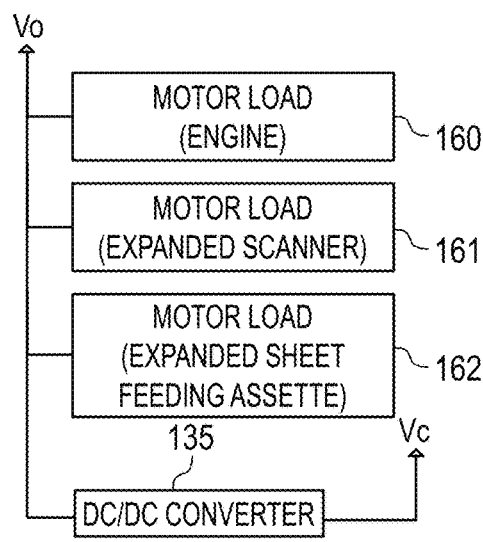

FIG. 4B is a diagram illustrating a parts mounting state of the circuit board 157 in a case of a product model A of the image forming apparatus, and illustrates a parts surface on which the parts of the circuit board 157 are mounted. In FIG. 4B, the resistor 141 as a resistor for the snubber circuit is mounted, via the hole 151, on a parts surface opposite to the side of the circuit board 157 on which the thermistor 126 is mounted. Distances between the thermistor 126 and positions where the SBD 107 for rectification as a heat generation source and the resistor 141 for the snubber circuit are mounted on the circuit board 157 have effects on a threshold temperature for the overheat protection circuit 136. Therefore, the threshold temperature for the overheat protection circuit 136 to detect the overheating state is determined taking into account the dispersion of detection temperature of the thermistor 126 in the product model A described below, and thereafter, a mount position of the resistor for the snubber circuit on the circuit board 157 is determined.

The product model A is a product model to which a scanner and a paper cassette are added besides the image forming unit that is the print engine. For this reason, the power needs to be supplied from the switching power supply apparatus 100 to the motor load (engine) 160, the motor load (expanded scanner) 161 and the motor load (expanded sheet feeding cassette) 162, and therefore, a power supply amount from the secondary side of the transformer 104 is large. Therefore, as illustrated in FIG. 4B, in the circuit board 157 of the switching power supply apparatus 100 used for the product model A, a heat sink 155 for heat release is attached to the SBD 107 for rectification.

The temperature at which the overheat protection circuit 136 detects the overheating state described above needs to be set to a temperature lower than a limiting temperature at which thermorunaway occurs in the FET 106 or the SBD 107 for rectification and a limiting temperature at which a winding coating or insulator used for the transformer 104 is degraded to cause insulation breakdown. For example, assume that a temperature 130° C. is reached that is the limiting temperature at which thermorunaway occurs in the SBD 107 provided on the circuit board 157, and at that time, the detection temperature of the thermistor 126 provided on the circuit board 157 is 128° C. Additionally, assume that the overheat protection circuit 136 determines the overheating state based on the temperature detected by the thermistor 126, and a center value of an operation temperature for starting an overheat protection operation is 100° C. The dispersion of the detection temperature, at 100° C., of the thermistor 126 illustrated in FIG. 3 is ±27° C., and the threshold temperature for the overheat protection circuit 136 is set such that the overheat protection circuit 136 operates at an upper limit temperature 127° C. (=100° C.+27° C.) taking the dispersion of the detection temperature into account. Specifically, the resistor values of the resistors 123, 124 and 125 are set such that an output from the comparator 114 of the overheat protection circuit 136 is the low level in a case that the resistor value of the thermistor 126 illustrated in FIG. 2 is a resistor value lower than that at the temperature 100° C. By doing so, the output signal from the Out terminal of the power supply control IC 103 is the low level when the output from the comparator 114 is the low level, and therefore, the switching operation of the FET 106 is forced to stop and the power supply to the load is blocked. As a result, the overheat protection circuit 136 operates at a temperature lower than the detection temperature 128° C. of the thermistor 126 at which thermorunaway occurs in the SBD 107, the overheating state of the FET 106 or the SBD 107 is eliminated.

On the other hand, a lower limit temperature at which the overheat protection circuit 136 operates needs to be confirmed such that the overheat protection circuit 136 does not erroneously operate when the image forming apparatus is in an ordinary printing state. The dispersion of the detection temperature, at 100° C., of the thermistor 126 for use is ±27° C., and a lower limit value of the detection temperature is 73° C. (=100° C.-27° C.) taking the dispersion of the detection temperature into account. The detection temperature of the thermistor 126 when the image forming apparatus is in the ordinary printing is affected by peripheral parts or a sealing degree of a product body. Therefore, in a case that the detection temperature of the thermistor 126 is 70° C. owing to an effect of a temperature of an inner side of the body when the image forming apparatus is in the ordinary printing, if the lower limit temperature of the threshold temperature for the overheat protection circuit 136 to start the operation based on the detection temperature of the thermistor 126 is lower than 70° C., an erroneous detection occurs. Therefore, the lower limit temperature at which the overheat protection circuit 136 detects the overheating state can be a temperature higher than 70° C.

In this way, the threshold temperature at which a circuit protection operation is started by the overheat protection circuit 136 is adjusted and determined such that the limiting temperature of the FET 106, the SBD 107 or the transformer 104 is not exceeded and further the overheat protection circuit 136 does not erroneously operate in the ordinary printing state. Then, the mount position of the resistor for the snubber circuit of the SBD 107 is selected from the through-holes 151 to 154 such that the detection temperature of the thermistor 126 is 128° C. when the SBD 107 is at a temperature 130° C. in the circuit board 157 on which the SBD 107 or the transformer 104 is mounted. The resistor for the snubber circuit is mounted in the selected through-hole. For example, in the product model A in FIG. 4B, the through-hole 151 is selected and the resistor 141 is mounted.

In a case that a margin for the dispersion of the detection temperature of the thermistor 126 is further increased, the margin is ensured by taking a measure as below without difficulty even taking into account the dispersion of the detection temperature of the thermistor 126. For example, the limiting temperature is increased by increasing a size of the heat sink attached to the SBD 107 or changing a winding diameter of the transformer 104 so that the margin can be ensured without occurrence of the erroneous detection even taking into account the dispersion of the detection temperature of the thermistor 126.

(Parts Mounting on Product Model B)

Figure 4C:
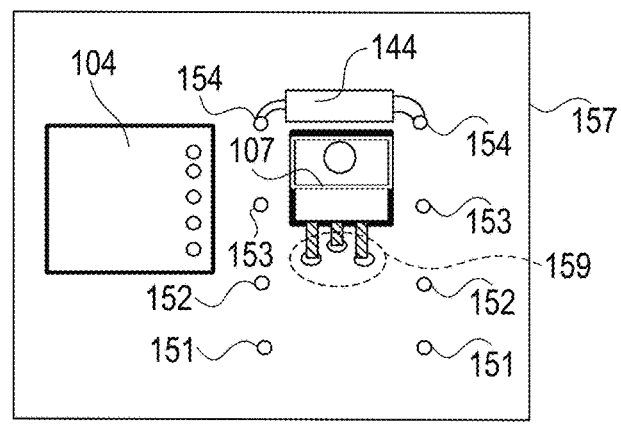
Figure 4C:
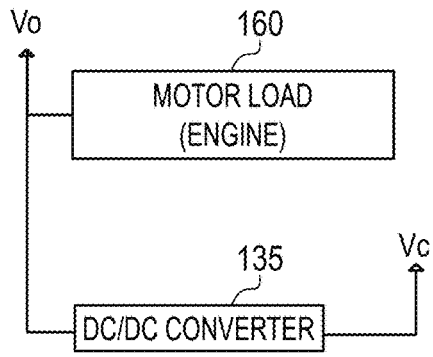

FIG. 4C is a diagram illustrating a parts mounting state of the circuit board 157 in a case of a product model B of the image forming apparatus, and illustrates a parts surface on which the parts of the circuit board are mounted. In FIG. 4C, the resistor 144 as a resistor for the snubber circuit is mounted, via the hole 154, on a parts surface opposite to the side of the circuit board 157 on which the thermistor 126 is mounted. In the product model B also similar to the product model A described above, distances between the thermistor 126 and positions where the SBD 107 as a heat generation source and the resistor 144 are mounted on the circuit board 157 have effects on the threshold temperature for the overheat protection circuit 136. Therefore, the threshold temperature for the overheat protection circuit 136 to operate is determined taking into account the dispersion of detection temperature of the thermistor 126 in the product model B described below, and thereafter, a mount position of the resistor for the snubber circuit on the circuit board 157 is determined.

The product model B is a product model provided with only an image forming unit that is a print engine with no scanner and no paper cassette being added, and the circuit board 157 of the switching power supply apparatus 100 is the same circuit board 157 as the product model A. The product model B is a product model with lower power consumption, and since the power supplied from the secondary side of the transformer 104 of the switching power supply apparatus 100 is small, the heat sink 155 for heat release is not attached to the SBD 107. An amount of heat generation of the SBD 107 varies according to the presence or absence of the heat sink, and in the case that the heat sink is not attached, if a current equivalent to the product model A described above flows through the SBD 107, the amount of heat generation of the SBD 107 increases. Therefore, the detection temperature of the thermistor 126 in the product model B is higher as compared with the product model A.

The effect of the peripheral parts or the heightened sealing degree of the product body may cause the detection temperature of the thermistor 126 in the product model B to be higher as compared with the product model A described above in some cases. For example, in a case that the detection temperature of the thermistor 126 uniformly increases by 20° C. as compared with the product model A, the temperature of the SBD 107 of the product model B increases up to 150° C. (=130° C.+20° C.). The detection temperature of the thermistor 126 when the image forming apparatus is in the ordinary printing increases by 20° C. as compared with the product model A to be 90° C. (=70° C.+20° C.). In this case, the center of the operation starting temperature for the overheat protection circuit 136 to start the protection operation need to be raised from 100° C. to 120° C. However, raising the center value of the operation starting temperature (threshold temperature) for the overheat protection circuit 136 from 100° C. to 120° C. leads to accuracy degradation of the dispersion of the detection temperature of the thermistor 126. Specifically, the dispersion of the detection temperature of the thermistor 126 varies from ±27° C. (detection temperature range (width) is 54° C.) at the detection temperature of 100° C. to ±34° C. (detection temperature range (width) is 68° C.) at the detection temperature of 120° C. As a result, the accuracy of the dispersion of the detection temperature is decreased by 14° C. (=68° C.-54° C.). Therefore, in the product model B, in order to decrease the detection temperature of the thermistor 126 when the image forming apparatus is in an ordinary printing state from 90° C. by 20° C. to 70° C., the resistor for the snubber circuit is changed from the resistor 141 mounted in the hole 151 to the resistor 144 mounted in the hole 154.

A position of the hole (through-hole) where the resistor for the snubber circuit is mounted is determined in the product model B as below. Specifically, the mount position of the resistor for the snubber circuit is determined by adjusting the distances from the thermistor 126 and the SBD 107 so that the detection temperature of the thermistor 126 is 128° C. when the temperature of the SBD 107 is 130° C. in the circuit board on which the SBD 107 or the transformer 104 is mounted. Then, the resistor for the snubber circuit is mounted to conform to the determined mount position. For example, in the product model B in FIG. 4C, the hole 154 is selected and the resistor 144 is mounted. In this way, the resistor for the snubber circuit is moved to the position apart from the thermistor 126 such that the effect, on the thermistor 126, of the heat generation by the resistor for the snubber circuit can be decreased. By doing so, the product model B does not need to use the thermistor 126 at the high temperature. As a result, without increasing the detection dispersion ±27° C. (FIG. 3) at the operation temperature 100° C. for the overheat protection circuit 136, the overheating state can be detected using the unified threshold temperature the same as the product model A with a higher power consumption to perform the overheat protection.

Hereinbefore, the description has been given of the circuit board 157 in which the mount position of the snubber resistor is adjustable according to the product model in order to unify the operation starting temperature for the overheat protection circuit 136 in the all product models. For example, a method can be considered in which multiple mount patterns of the thermistor 126 are provided to set the unified threshold temperature for the overheat protection circuit 136 to start the operation. However, since a high current flows through the circuit pattern for connecting the transformer 104 and the SBD 107 for rectification, the wiring pattern needs to be set as thick as possible taking ringing into account. Therefore, if multiple mount patterns of the thermistor 126 are provided, the wiring pattern for connecting the transformer 104 and the SBD 107 may possibly have to be thinner. On the other hand, in the embodiment, since the multiple holes for mounting the resistors for the snubber circuit are provided, the wiring pattern for connecting the transformer 104 and the SBD 107 can be configured to be a thicker wiring pattern.

In the product model B illustrated in FIG. 4C, the resistor 144 is mounted as a resistor for the snubber circuit, but the resistor 142 or the resistor 143 may be used to finely adjust the heat generation detection temperature of the thermistor 126, for example. Furthermore, in the case that the operation temperature for the overheat protection circuit 136 of the product model A is decreased owing to the effect of the peripheral parts or the sealing degree of the product body, the resistor 144 may be mounted on the product model A.

In this way, changing the mount position of the lead-type resistor according to the load state of the product model enables to detect the overheating state using the unified threshold temperature for the overheat protection circuit 136 to start the operation using the same board circuit on which the multiple mount positions of the resistors for the snubber circuit are provided. As a result, without varying the dispersion of the overheat protection detection temperature in the circuit board 157 of the switching power supply apparatus for each product model for the multiple product models, a highly reliable overheat protection circuit can be configured.

As described above, according to the embodiment, the overheating state can be detected in the circuit configuration using the same circuit board for the different product models.

Embodiment 2

In the embodiment 1, the example using the lead-type resistor as a resistor for the snubber circuit is described. In an embodiment 2, a description is given of an example using a chip-type resistor as a resistor for the snubber circuit.

[Circuit Board of Switching Power Supply Apparatus]

Figure 5A:
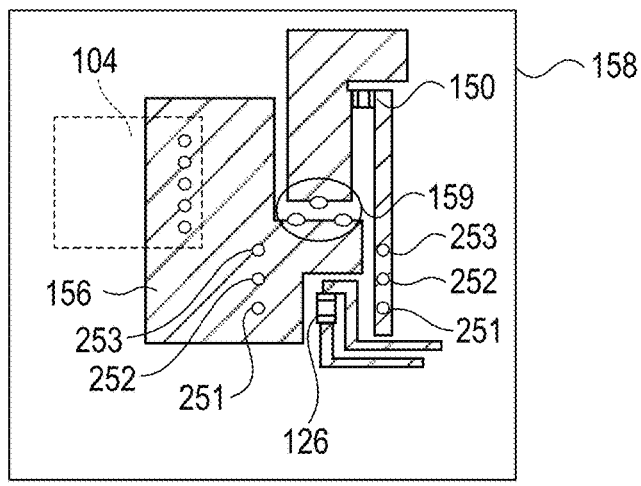
FIG. 5A illustrates a circuit pattern of a board in the embodiment 2.

Subsequently, a description is given of a configuration of a circuit board of the switching power supply apparatus 100 in the embodiment. The circuit board in the embodiment is also common to the respective product models similar to the embodiment 1. FIG. 5A is a diagram illustrating a solder surface side of a circuit board 158. FIG. 5A is the diagram cutting out and illustrating a part of the circuit board 158 on which mounted are the transformer 104, a SBD 207 for rectification, the thermistor 126, through holes 251 to 253 for mounting the resistors 241 to 243, and the capacitor 150 among the circuit configuration illustrated in FIG. 1. In FIG. 5A, a hatched part is a wiring pattern (circuit pattern), and the chip thermistor 126 and the capacitor 150 are surface-mounted on the solder surface side. The thermistor 126 is arranged near a located position 159 of the SBD 207 in such a manner as not to prohibit the wiring pattern from running from the transformer 104 to the SBD 207. The circuit board 158 is provided with holes (through-holes) 251, 252 and 253 which are mounting sections for mounting the chip-type resistors 241 to 243 for the snubber circuit of the SBD 207. Provided are land patterns 261, 262 and 263 (see FIG. 5B) with which chip-type resistors 241, 242 (not illustrated) and 243 can be mounted on a parts surface opposite to the side of the circuit board 158 via the through-holes 251, 252 and 253 on a pattern illustrated in FIG. 5A. This allows the resistors for the snubber circuit to be mounted to be gradually apart from near the thermistor 126 in an order of the resistors 241, 242 and 243. In the circuit board 158 illustrated in FIG. 5A, positions where the transformer 104 and the thermistor 126 are mounted are determined. Each of the resistors 241 to 243 is a heat generating element similar to the SBD 207, and has an effect on the temperature detection by the thermistor 126. Therefore, any resistor of the resistors 241 to 243 is used according to the product model using the switching power supply apparatus 100.

(Parts Mounting on Product Model C)

Figure 5B:
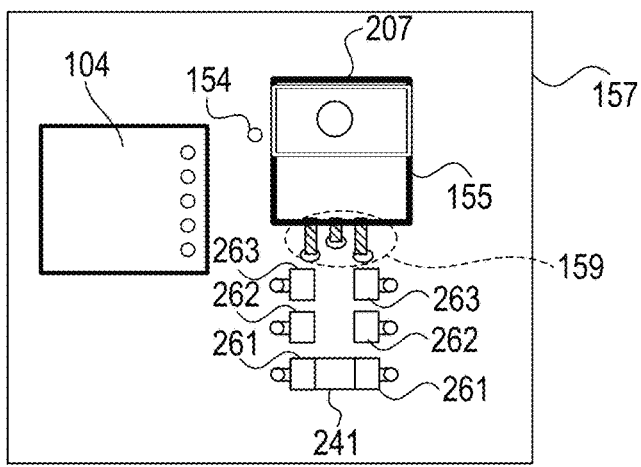
FIG. 5B and FIG. 5C are each a diagram illustrating a parts mounting state on a board for each product in the embodiment 2.
Figure 5B:
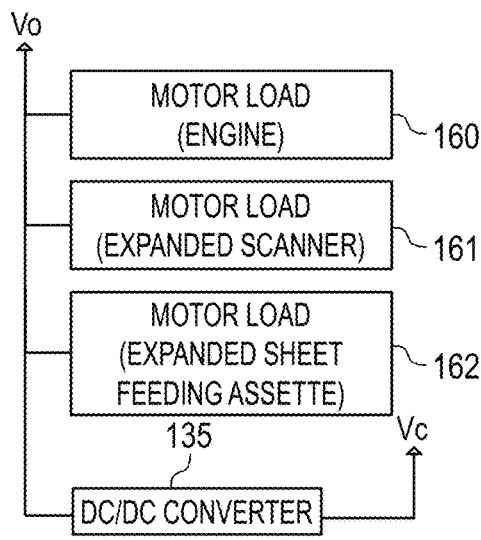

FIG. 5B is a diagram illustrating a parts mounting state of the circuit board 157 in a case of a product model C of the image forming apparatus, and illustrates a parts surface on which the parts of the circuit board 158 are mounted. In FIG. 5B, the resistor 241 as a resistor for the snubber circuit is mounted, via the land pattern 261, on a parts surface opposite to the side of the circuit board 158. The product model C is a product model to which a scanner and a paper cassette are added besides the image forming unit that is the print engine. For this reason, the power needs to be supplied from the switching power supply apparatus 100 to the motor load (engine) 160, the motor load (expanded scanner) 161 and the motor load (expanded sheet feeding cassette) 162, and therefore, a power supply amount of the secondary side of the transformer 104 is large. Therefore, as illustrated in FIG. 5B, in the circuit board 158 of the switching power supply apparatus 100 used for the product model C, expensive parts having a large package and a low characteristic value of the forward voltage Vf are used for the SBD 207 for rectification.

For example, assume that in the product model C of the image forming apparatus illustrated in FIG. 5B, the detection temperature of the thermistor 126 in an ordinary printing state is 79° C. If, similar to the thermistor 126 in the embodiment 1, the center value of the threshold temperature of the thermistor 126 for the overheat protection circuit 136 to start the operation is 100° C. and the dispersion of the detection temperature is ±27° C., the overheat protection circuit 136 operates even in the ordinary printing state in the case of the product model C. Therefore, in the embodiment, assume that the detection temperature of the thermistor 126 for the overheat protection circuit 136 to start the operation is 110° C. The dispersion of the detection temperature of the thermistor 126 in the case that the detection temperature is 110° C. is that in FIG. 3±30° C. Therefore, when the image forming apparatus of the product model C is in an ordinary printing state, the lower limit temperature of the detection temperature of the thermistor 126 is 80° C. (=110° C.-30° C.), which is the threshold temperature of the thermistor 126 for the overheat protection circuit 136 not to operate.

(Parts Mounting on Product Model D)

Figure 5C:
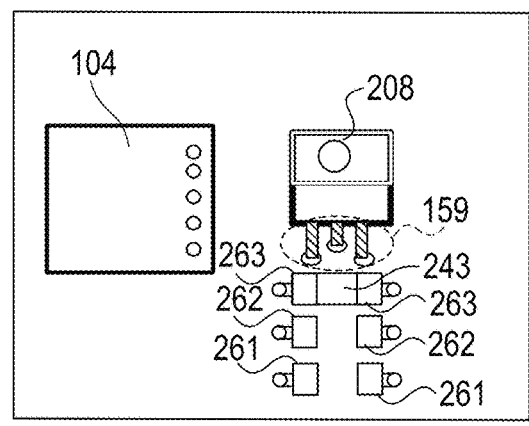
Figure 5C:
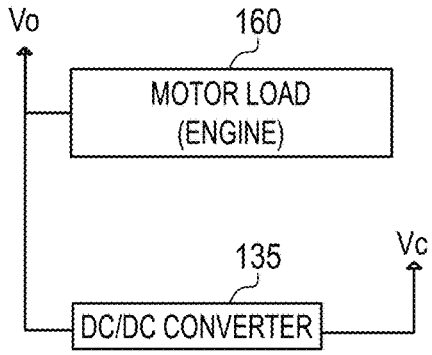

FIG. 5C is a diagram illustrating a parts mounting state of the circuit board 158 in a case of a product model D of the image forming apparatus, and illustrates a parts surface on which the parts of the circuit board 158 are mounted. In FIG. 5C, the resistor 243 as a resistor for the snubber circuit is mounted, via the land pattern 263, on a parts surface on a back side of the circuit board 158. The product model D is a product model provided with only an image forming unit that is a print engine with no scanner and no paper cassette being added. Therefore, since the power is supplied from the switching power supply apparatus 100 only to the motor load (engine) 160, and thus, the power supply amount of the secondary side of the transformer 104 is small, inexpensive parts having a small package and a high characteristic value of the forward voltage Vf is used for the SBD 208.

For example, assume that in the product model D of the image forming apparatus, the detection temperature of the thermistor 126 in an ordinary printing state may be 89° C. in some cases owing to the effect of the peripheral parts or the effect of the sealing degree of the product body. In this case, similar to the product model C, if the detection temperature of the thermistor 126 for the overheat protection circuit 136 to start the operation is 110° C. and the dispersion of the detection temperature is ±30° C., the lower limit temperature of the threshold temperature for the overheat protection circuit 136 is 80° C. (=110° C.-30° C.). Therefore, the overheat protection circuit 136 operates in the ordinary printing state where the detection temperature of the thermistor 126 is 89° C. For this reason, as illustrated in FIG. 5C, the mount position of the resistor for the snubber circuit that is a heat generation source is changed from the position of the resistor 241 in FIG. 5B to the position of the resistor 243. The mount position of the resistor for the snubber circuit is moved to the position apart from the thermistor 126 such that the effect, on the thermistor 126, of the heat generation by the resistor can be decreased. By doing so, the product model D does not need to set the threshold temperature of the thermistor 126 for the overheat protection circuit 136 to the high temperature. Therefore, without increasing the dispersion of the detection temperature for the overheat protection circuit 136, the overheating state can be detected using the unified threshold temperature the same as the product model C with a high power consumption. As a result, the circuit board of the switching power supply apparatus does not need to be produced to conform the multiple product models of the image forming apparatus, the mount position of the resistor may only be changed according to the product model, and the cost can be suppressed.

As described above, according to the embodiment, the overheating state can be detected in the circuit configuration using the same circuit board for the different product models.

Embodiment 3

The switching power supply apparatus described in the embodiments 1 and 2 can be applied as a low-voltage power supply for the image forming apparatus, that is, a power supply apparatus supplying the power to a driving unit such as a controller (control unit) or a motor, for example. Hereinafter, a description is given of the image forming apparatus to which the power supply apparatus in the embodiments 1 and 2 is applied.

[Configuration of Image Forming Apparatus]

A laser beam printer is described as an example of the image forming apparatus. FIG. 6 illustrates a schematic configuration of the laser beam printer that is an example of an electrophotographic printer. A laser beam printer 300 includes a photosensitive drum 311 as an image carrier where an electrostatic latent image is formed, a charging unit 317 (charging device) uniformly charging the photosensitive drum 311, and a developing unit 312 (developing device) developing the electrostatic latent image formed on the photosensitive drum 311 by a toner. Then, a toner image developed on the photosensitive drum 311 is transferred to a sheet (not illustrated) as a recording material fed from a cassette 316 by a transfer unit 318 (transfer device), and the toner image transferred to the sheet is fused by a fuser 314 and discharge to a tray 315. These photosensitive drum 311, charging unit 317, developing unit 312, and transfer unit 318 are included in the image forming unit. The laser beam printer 300 includes a power supply apparatus 500 that is the switching power supply apparatus 100 or 200 described in the embodiments 1 and 2. The image forming apparatus to which the power supply apparatus 500 can be applied is not limited to those illustrated in FIG. 5A to FIG. 5C, and may be an image forming apparatus including multiple image forming units, for example. Furthermore, the relevant image forming apparatus may be an image forming apparatus including a primary transfer unit transferring a the toner image on the photosensitive drum 311 to an intermediate transfer belt, and a secondary transfer unit transferring the toner image on the intermediate transfer belt to the sheet.

The laser beam printer 300 includes a controller 320 controlling an image forming operation by the image forming unit and a sheet conveying operation. The controller 320 is supplied with the power via the DC/DC converter 135 from the power supply apparatus 500 that is the switching power supply apparatus 100 described in the embodiments 1 and 2. The power supply apparatus 500 that is the switching power supply apparatus 100 described in the embodiments 1 and 2 supplies the power to the motor load (engine) 160 that is a driving unit such as a motor for rotating the photosensitive drum 311 or driving various rollers to convey the sheet. Moreover, in the power supply apparatus 500 that is the switching power supply apparatus 100 described in embodiment 1, the controller 320 corresponding to an external CPU in the embodiment 1 outputs the PowerSave signal for switching the output voltage Vo. By doing so, the controller 320 can control the power supply apparatus 500. The image forming apparatus to which a scanner apparatus (not illustrated) or the cassette 316 having a recording materials stacked therein is added can also include the power supply apparatus 500 on which the overheat protection circuit for detecting the overheating state using the unified threshold temperature is mounted as described in the embodiments 1 and 2.

As described above, according to the embodiment, the overheating state can be detected in the circuit configuration using the same circuit board for the different product models.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-005349, filed Jan. 17, 2018, and Japanese Patent Application No. 2018-217207, filed Nov. 20, 2018, which are hereby incorporated by reference herein in their entirety.

What is claimed is:

1. A power supply apparatus comprising:
a circuit board including:
a transformer having a primary winding and a secondary winding,
a switching element connected in series with the primary winding of the transformer,
a rectification element connected with the secondary winding of the transformer and configured to rectify a voltage generated in the second winding so as to generate an output voltage,
a detection unit configured to detect temperature of the rectification element in a case where power is supplied to the transformer by a switching operation of the switching element, and
a circuit in which a capacitor and a resistance element are connected in series, the circuit connected in parallel with the rectification element,
wherein the resistance element is mounted at a predetermined mounting section among mounting sections on the circuit board,
wherein the detection unit has a voltage dividing circuit dividing the output voltage,
wherein the voltage dividing circuit includes a temperature detection element whose resistor value varies according to a temperature, and a voltage dividing resistance element connected to the temperature detection element,
wherein the detection unit outputs an overheating detection signal to a control unit when an overheating state of the rectification element is detected based on a voltage obtained by dividing the output voltage by the voltage dividing circuit, and
wherein the control unit turns off the switching element according to the overheating detection signal to stop generation of the output voltage.

2. The power supply apparatus according to claim 1, wherein the power supply apparatus is installed in a first image forming apparatus or a second image forming apparatus,
wherein the first image forming apparatus includes an image forming unit, a reading unit and a paper feeding unit, and the second image forming apparatus includes an image forming unit, and
wherein the predetermined mounting section is selected differently according to the first image forming apparatus and the second image forming apparatus.

3. The power supply apparatus according to claim 2, wherein a load to which an output voltage from the power supply apparatus is supplied in the first image forming apparatus is larger than a load to which an output voltage from the power supply apparatus is supplied in the second image forming apparatus.

4. The power supply apparatus according to claim 1, wherein the temperature detection element is a thermistor, and
wherein the overheating state detected by the detection unit is capable of setting as a predetermined temperature according to a temperature detected by the thermistor.

5. The power supply apparatus according to claim 4, wherein the rectification element is a schottky barrier diode,
wherein the resistance element is a resistor for a snubber circuit of the schottky barrier diode,
wherein the mounting sections are through-holes provided on the circuit board so that distances from the thermistor to the through-holes are different, and
wherein the resistance element is mounted in a through-hole among the through-holes, the through-hole is chosen so that the lighter the load is, the closer to the thermistor the resistance element is, and the heavier the load is, the farther from the thermistor the resistance element is.

6. The power supply apparatus according to claim 5, wherein the schottky barrier diode has a heat sink for heat release attached thereto according to a state of the load, and
a position of the through-hole at which the resistor is mounted is changed according to presence or absence of the heat sink.

7. The power supply apparatus according to claim 6, wherein the resistance element is a lead-type resistor, and
wherein the resistance element is mounted on a surface opposite to a surface of the circuit board on which the thermistor is mounted.

8. The power supply apparatus according to claim 3,
wherein the rectification element is a schottky barrier diode,
wherein the resistance element is a chip-type resistor for a snubber circuit of the schottky barrier diode, and
wherein the resistance element is mounted in a mounting section among the mounting sections, and the mounting section mounting the resistance element is chosen so that the lighter the load is, the closer to a thermistor the resistance element is, and the heavier the load is, the farther from the thermistor the resistance element is.

9. The power supply apparatus according to claim 8, wherein the resistance element is mounted on a surface opposite to a surface of the circuit board on which the thermistor is mounted.

10. The power supply apparatus according to claim 1, wherein the switching element is controlled so as to switch the output voltage according to a switching signal being output from the control unit, wherein the output voltage is switched between a first voltage and a second voltage lower than the first voltage.

11. The power supply apparatus according to claim 10, comprising:

a feedback unit outputting, to the control unit, information according to a deviation between the output voltage and a target voltage corresponding to the output voltage, wherein the feedback unit has a first circuit unit operating in a case where the output voltage is the first output voltage, the first circuit unit configured to output the information according to a deviation between the first output voltage and a target voltage corresponding to the first output voltage, and a second circuit unit operating in a case where the output voltage is the second output voltage, the second circuit unit configured to output the information according to a deviation between the second output voltage and a target voltage corresponding to the second output voltage, and the control unit controls the switching element to be put into a turn-on state or a turn-off state based on the information output from the feedback unit.

12. The power supply apparatus according to claim 11, wherein the switching signal is input from outside.

13. An image forming apparatus comprising:
an image forming unit forming an image on a recording material; and
a power supply apparatus generating power for forming an image,
the power supply apparatus comprising:
a circuit board including:
a transformer having a primary winding and a secondary winding,
a switching element connected in series with the primary winding of the transformer,
a rectification element connected with the secondary winding of the transformer and configured to rectify a voltage generated in the second winding so as to generate an output voltage,
a detection unit configured to detect temperature of the rectification element in a case where power is supplied to the transformer by a switching operation of the switching element, and
a circuit in which a capacitor and a resistance element are connected in series, the circuit connected in parallel with the rectification element, wherein the resistance element is mounted at a predetermined mounting section among mounting sections on the circuit board, wherein the detection unit has a voltage dividing circuit dividing the output voltage, wherein the voltage dividing circuit includes a temperature detection element whose resistor value varies according to a temperature, and a voltage dividing resistance element connected to the temperature detection element, wherein the detection unit outputs an overheating detection signal to a control unit when an overheating state of the rectification element is detected based on a voltage obtained by dividing the output voltage by the voltage dividing circuit, and wherein the control unit turns off the switching element according to the overheating detection signal to stop generation of the output voltage.

14. The image forming apparatus according to claim 13, wherein the power supply apparatus is installed in a first image forming apparatus or a second image forming apparatus,
wherein the first image forming apparatus includes an image forming unit, a reading unit and a paper feeding unit, and the second image forming apparatus includes an image forming unit, and
wherein the predetermined mounting section is selected differently according to the first image forming apparatus and the second image forming apparatus.

15. The power supply apparatus according to claim 13, wherein a load to which an output voltage from the power supply apparatus is supplied in the first image forming apparatus is larger than a load to which an output voltage from the power supply apparatus is supplied in the second image forming apparatus.

16. The image forming apparatus according to claim 13, comprising:
a controller configured to control the image forming unit,
wherein the controller outputs the switching signal for switching the output voltage between the first voltage and the second voltage.

* * * * *